(12) United States Patent
Happ et al.

(10) Patent No.: US 11,450,928 B2
(45) Date of Patent: Sep. 20, 2022

(54) CELL-CONTACTING DEVICE FOR A BATTERY AND BATTERY

(71) Applicant: TE Connectivity Germany GmbH, Bensheim (DE)

(72) Inventors: Jonas Happ, Mannheim (DE); Jens Huber, Heppenheim (DE); Stefan Wallner, Lindenfels (DE); Gunther Chritz, Birkenau (DE)

(73) Assignee: TE Connectivity Germany GmbH, Bensheim (DE)

( * ) Notice: Subject to any disclaimer, the term of this patent is extended or adjusted under 35 U.S.C. 154(b) by 131 days.

(21) Appl. No.: 16/585,213

(22) Filed: Sep. 27, 2019

(65) Prior Publication Data

US 2020/0106076 A1    Apr. 2, 2020

(30) Foreign Application Priority Data

Sep. 27, 2018 (DE) .......................... 102018123956.4

(51) Int. Cl.
*H01M 50/502* (2021.01)
*H01R 9/16* (2006.01)

(52) U.S. Cl.
CPC ............ *H01M 50/502* (2021.01); *H01R 9/16* (2013.01)

(58) Field of Classification Search
CPC ..... H01R 9/19; H01R 25/162; H01M 50/502; H01M 50/507; H01M 50/503
See application file for complete search history.

(56) References Cited

U.S. PATENT DOCUMENTS

| 2010/0248029 | A1* | 9/2010 | Butt ...................... H01M 50/20 429/211 |
| 2016/0118728 | A1 | 4/2016 | Herrema et al. |
| 2017/0133656 | A1* | 5/2017 | Roemer .............. H01M 10/482 |
| 2017/0144566 | A1 | 5/2017 | Aschwer et al. |
| 2018/0108953 | A1* | 4/2018 | Tomobe ................ H01M 50/20 |
| 2018/0269454 | A1 | 9/2018 | De Souza et al. |

FOREIGN PATENT DOCUMENTS

| DE | 102008034876 A1 | 1/2010 |
| DE | 102014219178 A1 | 3/2016 |
| EP | 3304619 A1 | 4/2018 |
| WO | 2017036313 A1 | 3/2017 |

OTHER PUBLICATIONS

Extended European Search Report, App No. 19199478.9, dated Jan. 24, 2020, 7 pages.
European Office Action, Application No. 19199478.9-1108, dated Feb. 22, 2022, 4 pages.

* cited by examiner

*Primary Examiner* — Oscar C Jimenez
*Assistant Examiner* — Paul D Baillargeon
(74) *Attorney, Agent, or Firm* — Barley Snyder

(57) ABSTRACT

A cell-contacting device for a battery module includes a cell-connector support fitted onto a plurality of storage-cell modules of the battery module and a cell-connector sheet. The cell-connector support has a snap-fit arrangement. The cell-connector sheet is mounted on or in the cell-connector support by the snap-fit arrangement in a form-fitting manner.

23 Claims, 4 Drawing Sheets

CELL-CONTACTING DEVICE FOR A BATTERY AND BATTERY

CROSS-REFERENCE TO RELATED APPLICATION

This application claims the benefit of the filing date under 35 U.S.C. § 119(a)-(d) of German Patent Application No. 102018123956.4, filed on Sep. 27, 2018.

FIELD OF THE INVENTION

The present invention relates to an electromechanical cell-contacting device and, more particularly, to an electromechanical cell-contacting device for a battery of a motor vehicle.

BACKGROUND

In the electrical industry, such as in electronics, electrical engineering, electrical equipment, electrical power engineering, etc., a large number of electrical connector devices or connector units transmit electric currents, voltages, signals and/or data with a large range of currents, voltages, frequencies and/or data rates. In the low, medium or high voltage and/or current range, and in particular in the motor vehicle industry, such connectors must guarantee a transmission of electrical power, signals and/or data, in mechanically stressed, warm, possibly hot, contaminated, humid and/or chemically aggressive environments, permanently, repeatedly and/or at short notice after a comparatively long period of inactivity. On account of a wide range of applications, a large number of specially configured connectors is known.

High fuel costs and attempts to reduce environmental impacts make electric and hybrid vehicles necessary in the motor vehicle industry, for example. One aspect of such a motor vehicle is handling of high electric operating currents and/or voltages, wherein a relevant component, such as a battery for example, needs to be laid out accordingly. Such a battery is usually designed as a so-called traction battery, which serves to make electric drive energy available for an electric traction engine of the motor vehicle. The battery has an electric interconnection of electrochemical storage-cell modules, which are interconnected, for example, by an electromechanical cell-contacting device.

German Patent Application No. 102014219178 A1 discloses a cell-contacting device of a battery module of a battery of a motor vehicle, in particular of an electric or hybrid vehicle. The cell-contacting device has a plate-shaped support structure and several separately formed electromechanical contact elements. Each contact element electrically contacts exactly two directly mutually adjacent storage-cell modules of the battery module. The contact elements are arranged side-by-side in rows and fastened, in each case on one side, to supporting sections of the support structure. A mechanical connection between a supporting section and a relevant contact element takes place via a marginal weld point, wherein in each case a region of the contact elements opposite the weld point is freely movable.

Because an electric drive of an electric or hybrid vehicle can call up a high electric current at short notice, the contact elements inserted between the storage-cell modules of a battery must have a corresponding electrical conductivity and must possess the ability to compensate varying distances between the storage-cell modules on account of manufacturing tolerances. Moreover, the contact elements must contact the contact mechanisms (anodes, cathodes) of the storage-cell modules securely, i.e. without interruptions, when there are vibrations. Furthermore, the contact elements should be simple to mount and be able to be produced inexpensively.

SUMMARY

A cell-contacting device for a battery module includes a cell-connector support fitted onto a plurality of storage-cell modules of the battery module and a cell-connector sheet. The cell-connector support has a snap-fit arrangement. The cell-connector sheet is mounted on or in the cell-connector support by the snap-fit arrangement in a form-fitting manner.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
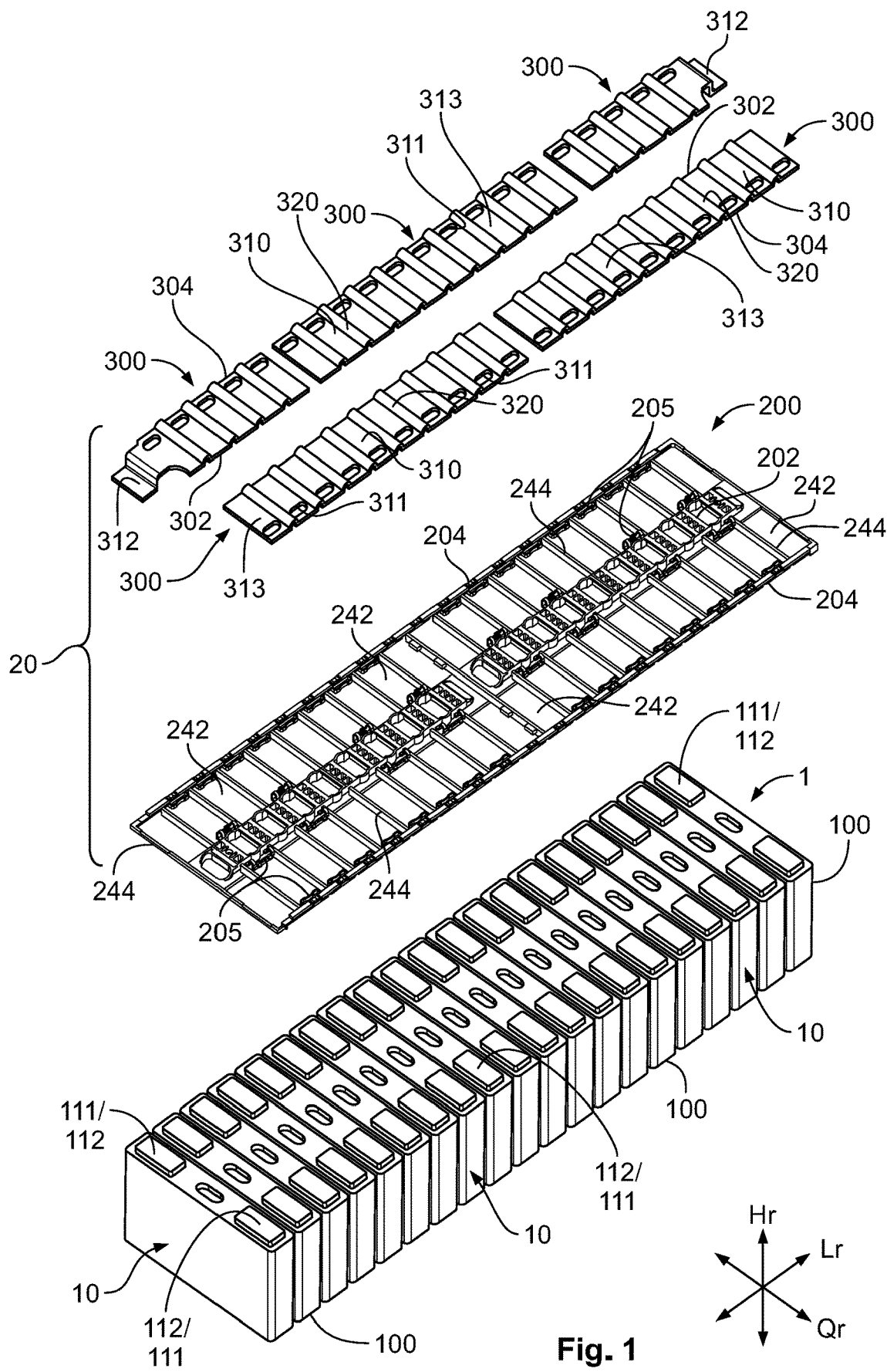
FIG. 1 is an exploded perspective view of a battery module and a cell-contacting device according to an embodiment.

The invention is explained in greater detail below using exemplary embodiments with reference to the attached schematic drawings, which are not true to scale. Sections, elements, components, units, diagrams and/or constituents which possess an identical, univocal or analogous form and/or function are identified by the same reference symbols in the description of the figures and in the figures of the drawings. A possible alternative, a steady-state and/or kinematic reversal, a combination, etc., which is not explained in the description of the invention, is not illustrated in the drawings and/or is not exclusive, with respect to the exemplary embodiments of the invention or a constituent, a diagram, a unit, a component, an element or a section thereof can furthermore be derived from the description of the figures.

In the case of the invention, a feature can be configured positively, i.e. present, or negatively, i.e. absent. A negative feature is not explained explicitly as a feature if, according to the invention, no importance is placed on the fact that it is absent, therefore the invention actually made, and not constructed by the prior art, consists in omitting that feature. A feature of this specification can be used not only in a specified manner, but rather can also be applied in another manner. In particular, it is possible using a reference symbol and a feature associated with this, or vice versa, in the description, the claims and/or the drawings, to replace, add or omit a feature in the claims and/or the description. Moreover, as a result, a feature can be explained and/or specified in greater detail in a claim.

The features of this description can also be interpreted as optional features; i.e. every feature can be regarded as an optional, arbitrary or non-binding feature. It is thus possible to detach a feature, possibly including its periphery, from an exemplary embodiment, this feature then being transferable to a generalized inventive concept. The lack of a feature in an exemplary embodiment shows that the feature is optional in relation to the invention. Furthermore, in the case of a type term for a feature, a generic term can also be inferred for the feature, as a result of which, for example taking equivalent effect and/or equivalence into account, a generalization of the feature is possible.

The invention is explained in greater detail below using exemplary embodiments of an electromechanical cell-contacting device 20, often also referred to as a cell-contacting system 20, for an electrochemical battery module 1 or an electrochemical accumulator module 1 of an electrochemical battery 0 or an electrochemical accumulator 0 of a motor vehicle. In particular, the invention can be applied to a traction-battery module 1 of a traction battery 0 of a hybrid or electric motor vehicle.

Although the invention is described and illustrated more closely and in greater detail by way of the exemplary embodiments, the invention is not limited by the disclosed exemplary embodiments, rather it is of a fundamental nature. Other variations can be derived from these without departing from the scope of protection of the invention. Thus, the invention can also generally be applied to battery modules or batteries and/or in a non-vehicle industry, such as an electrical engineering industry or power engineering industry etc., and very generally in engineering.

In the drawings, only those spatial sections of a subject-matter of the invention which are necessary for an understanding of the invention are depicted. The explanation of the invention below (coordinate system) concerns a longitudinal direction Lr and/or longitudinal axis Lr (length), a transverse direction Qr and/or transverse axis Qr (width), and a vertical direction Hr and/or vertical axis Hr (height) of the battery module 1 or of the cell-contacting device 20. The entity battery module 1 is understood to mean the entities battery package, battery pack, battery etc.

In an embodiment, shown in FIGS. 1 and 3-5, a plurality of electrochemical storage-cell modules 10 are electrically and mechanically combined to form a battery module 1 of a battery 0. In the shown embodiment, the battery module 1 has twenty electromechanical storage-cell modules 10. In other embodiments, the number of storage-cell modules 10 is at least two or three. A further mechanical securing of the storage-cell modules 10 together can take place with a housing, a cage, a tray and/or a cover etc. The battery module 1 can also be referred to as an accumulator. The battery module 1, in an embodiment, is of a battery 0 of a motor vehicle, such as a traction-battery module 1 of a traction battery 0 of a hybrid or electric motor vehicle.

A single storage-cell module 10, as shown in FIG. 1, has a mainly or substantially prismatic, and in the shown embodiment a mainly or substantially cuboid, cell housing 100. The cell housing 100 has a cell pole 111/112 formed as an anode and a cell pole 112/111 formed as a cathode. The cell pole 111, 112 is disposed on the outside of the cell housing 100 and, in the shown embodiment, can extend through the cell housing 100 or a cover of the cell housing 100.

Figure 3:
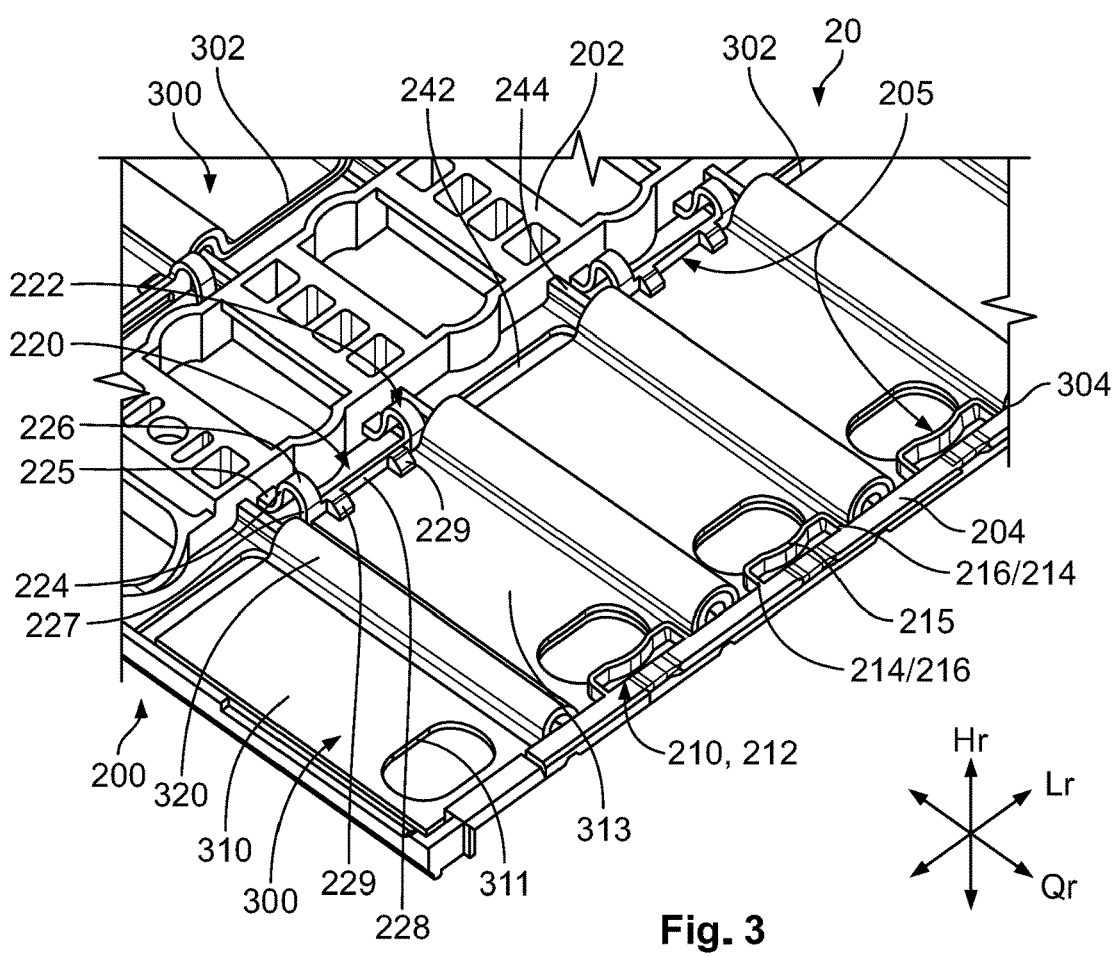
FIG. 3 is a perspective view of the cell-contacting device of FIG. 1 in a mounted state.
Figure 4:
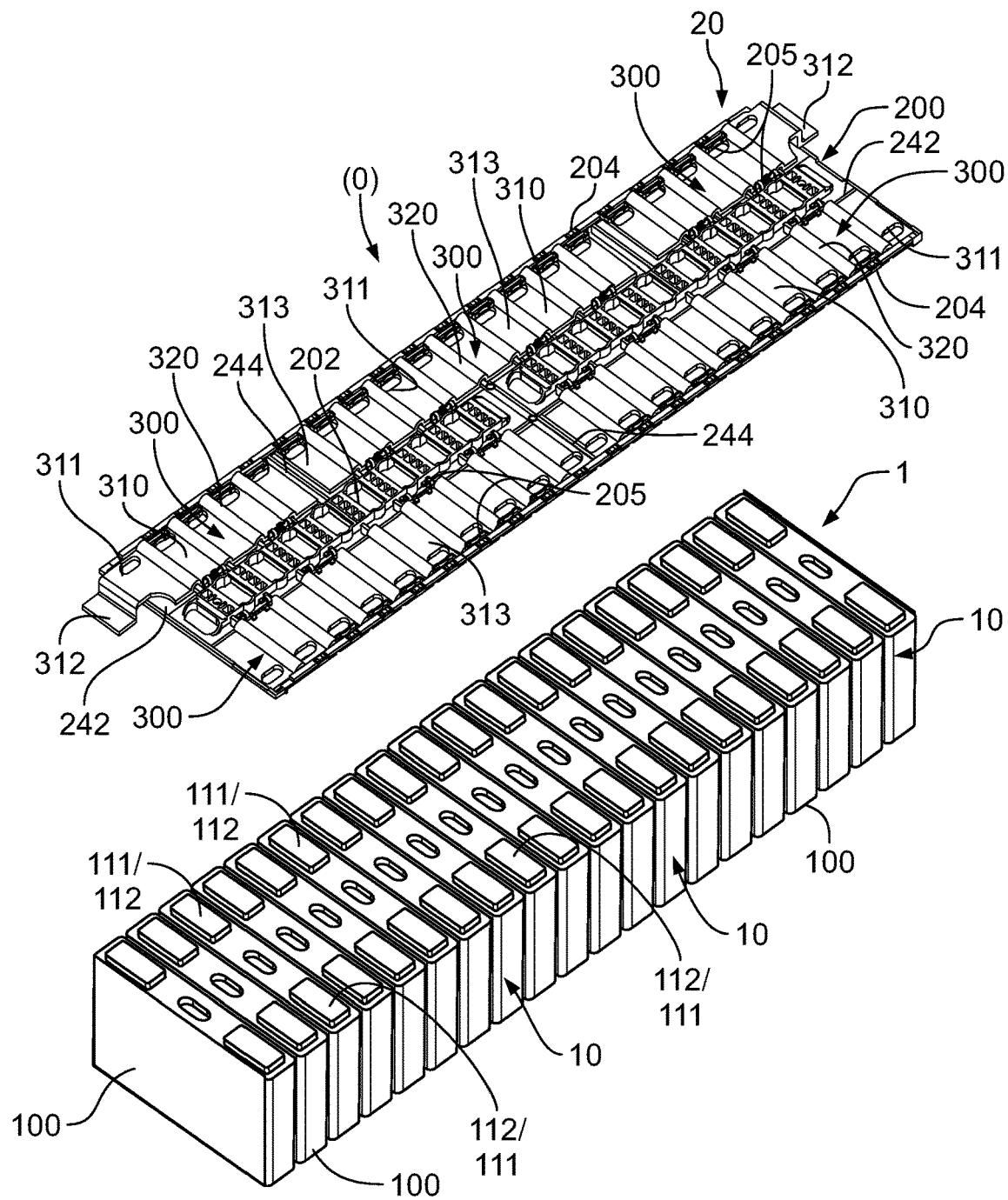
FIG. 4 is a perspective view of the battery module and the cell-contacting device of FIG. 1 with the cell-contacting device in the mounted state.
Figure 4:
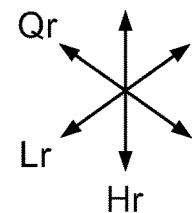
Figure 5:
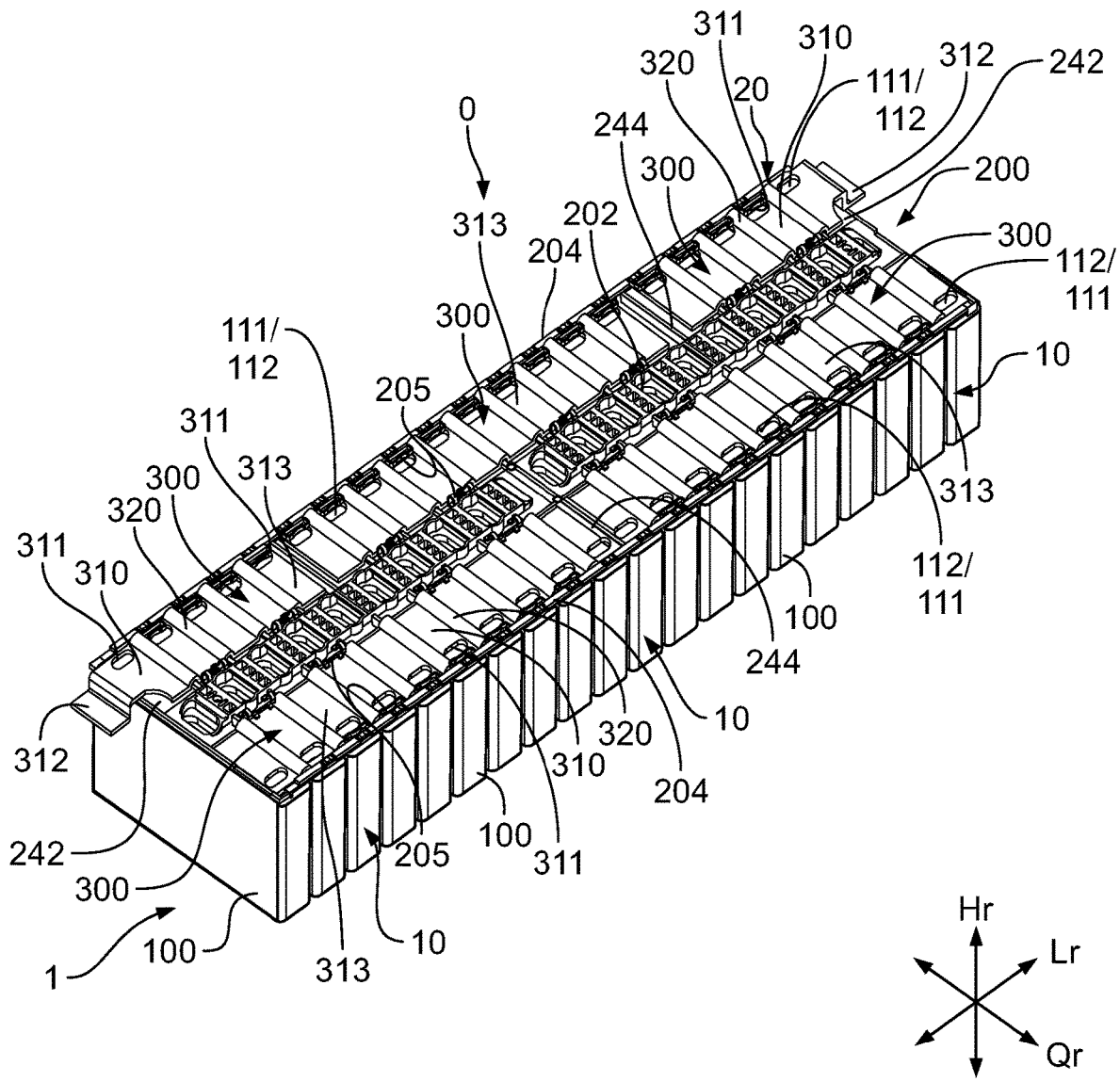
FIG. 5 is a perspective view of the battery module and the cell-contacting device of FIG. 1 in an installed state on the battery module.

The cell poles 111, 112, or only some of them, can be electrically and mechanically interconnected to the battery module 1 by the cell-contacting device 20, as shown in FIGS. 3-5. All or a portion of the cell poles 111, 112 can in turn be electrically connected to one another. The cell-contacting device 20 extends in a planar manner mainly or substantially in the transverse direction Qr and longitudinal direction Lr. The cell-contacting device 20 has a mechanical cell-connector support 200 and an electromechanical cell-connector sheet 300. In the shown embodiment, a single cell-connector support 200 has at least one cell-connector sheet 300, or a plurality of cell-connector sheets 300 in the shown embodiment, assigned to it.

The lattice-shaped cell-connector support 200, as shown in FIG. 1, extends mainly or substantially in the transverse direction Qr and longitudinal direction Lr. The cell-connector support 200 has at least one support frame 204 which is provided on a base bar 202. The base bar 202, in particular an internal border of the base bar 202, as depicted, can form a section of the support frame 204. The support frame 204 has a plurality of windows 242, which are formed from a plurality of bars 244, which bridge the support frame 204 completely on the inside. In an embodiment, the support frame 204 can be formed at least partially or completely in a circumferential manner, with the base bar 202 as one side.

The cell-connector support 200 can be formed as a cast part, for example, an injection-molded part. In an embodiment, the cell-connector support 200 is manufactured from a plastic. The cell-connector support 200 is formed materially in one piece or in an integral manner. In an embodiment, a sensor system and/or an electronics assembly can be integrated into the cell-connector support 200. Such a sensor system is formed, for example, as a voltage and/or temperature sensor system. Furthermore, such an electronics assembly can be formed, for example, as a monitoring electronics assembly. A cable channel can be integrated into the cell-connector support 200. Such a cable channel serves, for example, to lay a cable or a cable harness of the sensor system and/or of the electronics assembly. The cable channel is situated in the base bar 202 in an embodiment.

The cell-connector sheet 300, as shown in FIGS. 1, 4, and 5, extends in a planar manner in the transverse direction Qr and longitudinal direction Lr. The cell-connector sheet 300 has, in a mutually alternating manner, a plurality of electromechanical contacting mechanisms 310 for at least one cell pole 111/112 and a mechanical bridging region 320. In the shown embodiment, the cell-connector sheet 300 has a plurality of mechanical bridging regions 320. The cell-connector sheet 300 is formed mainly or substantially in a rectangular manner in the shown embodiment; other shapes can of course be applied. In other embodiments, a single contacting mechanism 310, corresponding to a single cell pole 111/112, can also be laid out for two or more cell poles 111/112 without being mechanically interrupted by a bridging region 320. The application of different such contacting mechanisms 310 per cell-connector sheet 300 is of course possible. The cell-connector sheet 300 can be formed as a stamped part, in particular a stamped bent part. In an embodiment, the cell-connector sheet 300 is formed materially in one piece or in an integral manner.

In the embodiment shown in FIGS. 1, 4, and 5, each contacting mechanism 310 has, depending on the number of cell poles 111/112 to be adjoined, a measuring recess 311 (also referred to as a measuring eye 311) and a welding region 313 (also referred to as a welding surface 313). In the shown embodiment, each contacting mechanism 310 has a single such measuring recess 311 and a single such welding region 313.

For the anodes of the battery module 1, the cell-connector sheet 300 has a current-tap mechanism 312 at a contacting mechanism 310, as shown in FIGS. 1, 4, and 5, or at a bridging region 320. The current-tap mechanism 312 can be formed in a tab-shaped manner. In other embodiments, the current-tap mechanism 312 can have other forms, such as a screw connection or a clamp. The current-tap mechanism 312 can protrude from the cell-connector sheet 300 in the longitudinal direction Lr, transverse direction Qr and/or vertical direction Hr. In the shown embodiment, the current-tap mechanism 312 protrudes laterally from the cell-connector sheet 300 or cell-connector support 200.

The bridging region 320 can serve as a mechanical and/or thermal compensation mechanism 320 of the cell-connector sheet 300 for position tolerances of the cell poles 111/112 and/or for thermal distance changes of the cell-connector sheet 300 and/or of the cell poles 111/112. At least one such, a plurality of, or all the bridging regions 320 of the cell-connector sheet 300 can be formed in this way. In a mounted state of a cell-connector sheet 300 on/in the cell-connector support 200, the contacting mechanisms 310 are arranged in the windows 242 and the bridging regions 320 are arranged on the bars 244. The bridging region 320 can be formed in a transverse cross-section as, for example, l-shaped, u-shaped, v-shaped, s-shaped, z-shaped etc.

As shown in FIGS. 1, 4, and 5, each cell-connector sheet 300 can be fixed to the cell-connector support 200 by a snap-fit arrangement 205 of the cell-connector support 200. The cell-connector sheet 300 can be fixed or is fixed at least in sections to/in the cell-connector support 200 in a substantially form-fitting manner. The snap-fit arrangement 205 can be formed in such a way that the cell-connector sheet 300 can be fixed or is fixed in sections to/in the cell-connector support 200 in a force-fitting manner.

The at least sectional form-fitting connection of the relevant cell-connector sheet 300 to/in the cell-connector support 200, in this case, is installed in a plane which is spanned by a longitudinal direction Lr and a transverse direction Qr. In both vertical directions Hr, for this purpose, the relevant cell-connector sheet 300 is retained by a latching device 210 and by a latching device 229 of the snap-fit arrangement 205 and the bars 244. The bars 244 secure a relevant cell-connector sheet 300 against a lateral sliding out from the cell-connector support 200.

Figure 2:
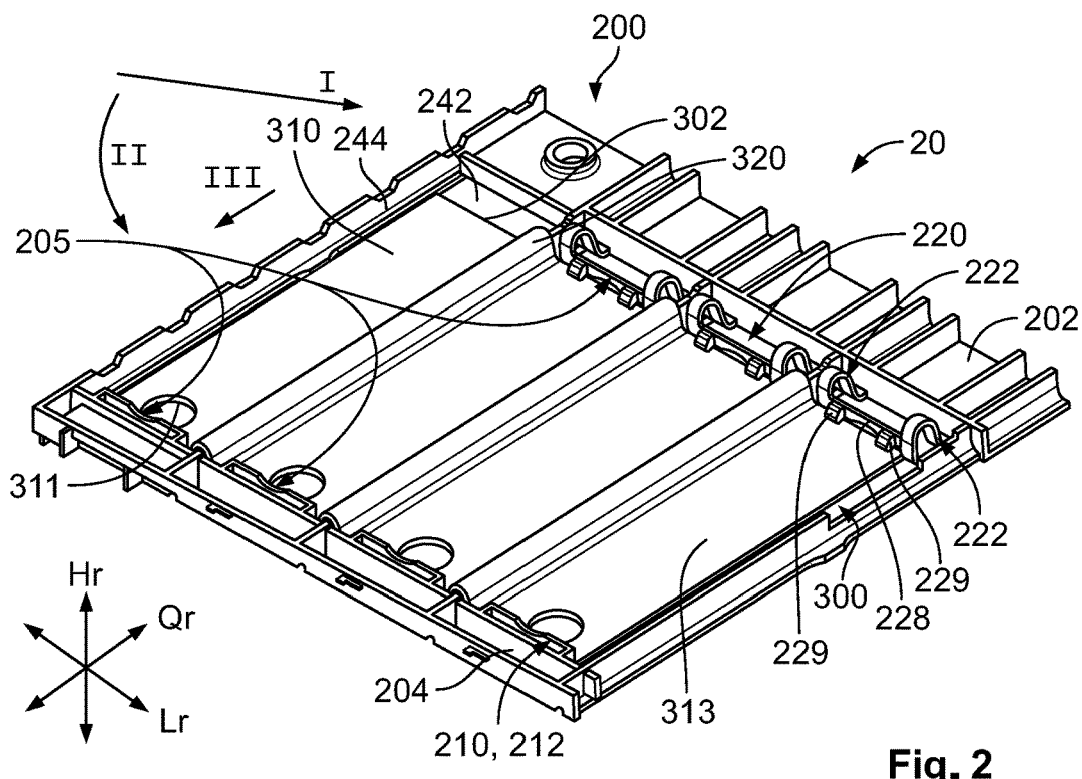
FIG. 2 is a perspective view of a cell-contacting device according to another embodiment in a mounted state.

The snap-fit arrangement 205, as shown in FIGS. 1, 4, and 5, is installed on/in the cell-connector support 200, in the support frame 204, or in particular in the support frame 204 between an outer border of the support frame 204 and the base bar 202. A single snap-fit arrangement 205, as shown in FIG. 2, has at least one substantially spring-loadable latching mechanism 220 and at least one substantially rigid latching device 210. It is also possible to constitute a snap-fit arrangement 205 from two spring-loadable latching mechanisms 220 or from two rigid latching devices 210.

The cell-contacting device 20 or the cell-connector support 200 and the respective cell-connector sheet 300 or the support frame 204 and also the base bar 202 and the respective cell-connector sheet 300 or the at least one snap-fit arrangement 205 are/is formed in such a way that the mounting movements I, II, III in FIG. 2 of the cell-connector sheet 300 onto the cell-connector support 200 are able to be carried out by the cell-connector sheet 300. In this case, the cell-connector sheet 300 can be mounted on/in the cell-connector support 200, with the result that the cell-connector sheet 300 can be installed in sections on/in the cell-connector support 200 in a substantially form-fitting manner.

In an embodiment, the cell-connector sheet 300, on two of its mutually opposed sides, can be installed in sections on or in the cell-connector support 200 in a substantially form-fitting manner. In the form-fitting connection, a border of the cell-connector sheet 300 is formed as a positive or a negative in relation to a border of the cell-connector support 200; the borders are complementary. A two-dimensional inner contour of the cell-connector support 200 can be formed to be substantially analogous to a relevant two-dimensional outer contour of the cell-connector sheet 300. These two sides that are form-fit are, for example, the longitudinal sides of the cell-connector sheet 300 which extend in the longitudinal direction. The cell-connector sheet 300, additionally on its third side and optionally additionally on its fourth side, can be installed or is installed in each case in sections on/in the cell-connector support 200 in a substantially form-fitting manner. These two sides are, for example, the transverse sides of the cell-connector sheet 300 which extend in the transverse direction.

The spring-loadable latching mechanism 220, as shown in FIG. 3, has two latching springs 222 formed as leaf springs 222, which are mechanically interconnected to their two spring arms 224 by a connecting bar 228. The connecting bar 228 has at least one substantially rigid connecting latching device 229. In an embodiment, the connecting bar 228 has two connecting latching devices 229. The latching mechanism 220 protrudes into a relevant window 242 or away beyond it and is formed in a plane at the window 242, spanned by a longitudinal direction Lr and a transverse direction Qr in a to-and-fro spring-loadable manner. Furthermore, a respective leaf spring 222 of the latching mechanism 220, in an embodiment, is formed as a 90° to 270° leaf spring 222, in particular a 180° leaf spring 222. In various embodiments, the spring-loadable latching mechanism 220 can be formed as a latching spring, a latching arm, a latching tab, etc.

A single latching spring 222 or leaf spring 222 has the spring arm 224, shown in FIG. 3, the attached longitudinal end section 225 of which is provided or formed on the cell-connector support 200, base bar 202, or support frame 204. The substantially spring-loadable spring region 226 of the spring arm 224 adjoins this attached longitudinal end section 225, the spring region 226 opening into a free longitudinal end section 227 of the spring arm 224, which is mechanically connected to a free longitudinal end section 227, directly adjacent thereto, of the other latching spring 222 via the connecting bar 228. In an embodiment, the spring region 226 is an arc section of the latching spring 222. In an embodiment, all the mechanical connections of the latching mechanism 220 are integral mechanical connections.

The rigid latching device 210 is formed here as a projection 212, as shown in FIG. 3, which is provided or formed on the cell-connector support 200, support frame 204, or base bar 202. The projection 212 is formed as a bracket 212, the attached first longitudinal end section 214 of which and the attached second longitudinal end section 216 of which are provided or formed on the cell-connector support 200, support frame 204, or base bar 202. Situated therebetween is a middle section 215 of the bracket 212, which protrudes beyond the relevant window 242 in the longitudinal direction Lr and transverse direction Qr in a substantially rigidly formed manner. In an embodiment, all the mechanical connections of the latching device 210 are integral mechanical connections. In various embodiments, the rigid latching device 210 can be formed as a wall, a latching element, a latching projection, a latching lug, a latching shoulder, a latching border, a latching edge, a latching recess etc.

The electromechanical cell-contacting device 20 of the embodiment shown in FIGS. 1, 3, and 5, has a single mechanical cell-connector support 200 and five electromechanical cell-connector sheets 300, of which three are provided for the anodes and two are provided for the cathodes of the battery module 1. The cell-connector sheets 300, which lie on the outside in the longitudinal direction Lr, possess in each case a current-tap mechanism 312 laterally standing out in the longitudinal direction Lr. The electro-mechanical cell-contacting device 20 of the embodiment shown in FIG. 2 has a single mechanical cell-connector support 200 and a single cell-connector sheet 300, for the anodes or for the cathodes of the battery module 1.

A mounting or an installation of the cell-connector sheet 300 on/in the cell-connector support 200 in the depicted embodiments is explained in greater detail below, with reference to FIGS. 2 and 3.

In a first step I, a first mounting movement I of the cell-connector sheet 300 onto the cell-connector support 200 takes place, the whole unattached or free (apart from a retention) cell-connector sheet 300 being moved with its inner outer border 302 in a linear and sharply forward manner towards the spring-loadable latching mechanisms 220 of the snap-fit arrangements 205. In this case, the cell-connector sheet 300 is moved so far towards the spring-loadable latching mechanisms 220 that the outer border 302 sits on and compresses the latching mechanisms 220.

In a second step II chronologically following the first step I, a second mounting movement II of the cell-connector sheet 300 towards the cell-connector support 200 takes place, the cell-connector sheet 300 attached on the inner outer border 302, lengthwise in the shown embodiment, being pivoted towards and into the cell-connector support 200. In this case, the contacting mechanisms 310 are placed into the windows 242 and the bridging regions 320 are placed onto the bars 244. The rigid latching mechanisms 210 of the snap-fit arrangement 205 are not yet 'active' or does do not yet fulfill their latching function with the cell-connector sheet 300.

In a third step III chronologically following the second step II, a third mounting movement III of the cell-connector sheet 300 towards the cell-connector support 200 takes place, the cell-connector sheet 300 arranged in a plane of the cell-connector support 200 being displaced in a substantially linear manner (transverse direction Qr) inside the cell-connector support 200. This can take place only on account of the rebounding spring-loadable latching mechanisms 220. In this case, the cell-connector sheet 300 reaches its mounted position or its installed position on or in the cell-connector support 200. The rigid latching mechanisms 210 of the snap-fit arrangement 205 are active or fulfill their latching functions with the cell-connector sheet 300. Each spring-loadable latching mechanism 220 can have a single rigid latching device 210 or a plurality of rigid latching devices 210 assigned to it.

The at least sectionally substantially form-fitting connection between the cell-connector support 200 and the relevant cell-connector sheet 300 is established. It is of course possible, in other embodiments, to combine these mounting movements I, II, III to make a single or two mounting movements. Furthermore, it is of course possible, depending on a form of the cell-contacting device 20, to apply at least one different linear movement (in a longitudinal direction Lr, in a transverse direction Qr and/or in a vertical direction Hr) and/or at least one different rotational movement (about a longitudinal axis Lr, about a transverse axis Qr and/or about a vertical axis Hr).

In an embodiment, at least on account of a spring path of the spring-loadable latching mechanism 220, a mechanical play of the cell-connector sheet 300 can exist in the transverse direction or longitudinal direction (compensation of position tolerances of the cell poles 111/112 in the transverse direction). Furthermore, alternatively or additionally, a mechanical play between the rigid latching device 210 and the cell-connector sheet 300, in the vertical direction, can be greater than or equal to a mechanical play between the spring-loadable latching mechanism 220 and the cell-connector sheet 300 (compensation of position tolerances of the cell poles 111/112 in the vertical direction).

The form-fitting connection serves to adapt to position tolerances of the cell poles 111/112 which the cell-connector sheets 300 can be welded or are welded. Such position tolerances exist, for example, in a vertical direction of the battery module 1, such that on the one hand the snap-fit arrangement 205 here should permit a certain mobility of the cell-connector sheet 300 and/or on the other hand the form-fitting connection is installed in a plane perpendicular thereto. The snap-fit arrangement 205 and/or the form-fitting connection furthermore secure the cell-connector sheet 300 during transportation.

After mounting, the cell-connector sheet 300 lies on the relevant cell poles 112/111 of the storage-cell modules 10, without being fixedly connected to them. The cell-connector sheet 300 can be mechanically fixedly connected, for example, to the battery module 1 or the battery. In the chronological sequence, for example after transportation of the battery module 1 or the battery, the cell-connector sheet 300 can be fixedly connected to the relevant cell poles 112/111 of the storage-cell modules 10, such as by welding. The cell-connector sheet 300 can be covered by a cover, which can also be an outer cover of the battery module 1.

What is claimed is:

1. A cell-contacting device for a battery module, comprising:
   a cell-connector support fitted onto a plurality of storage-cell modules of the battery module, the cell-connector support having a snap-fit arrangement, the snap-fit arrangement has a spring-loadable latching mechanism and a rigid latching device; and
   a cell-connector sheet mounted on or in the cell-connector support by the snap-fit arrangement in a form-fitting manner, the cell-connector sheet is installed and secured between the spring-loadable latching mechanism and the rigid latching device.

2. The cell-contacting device of claim 1, wherein the cell-connector sheet has a pair of opposite sides installed on or in the cell-connector support in the form-fitting manner.

3. The cell-contacting device of claim 2, wherein a third side and/or a fourth side of the cell-connector sheet are installed on or in the cell-connector support in the form-fitting manner.

4. The cell-contacting device of claim 1, wherein the snap-fit arrangement holds the cell-connector sheet on or in the cell-connector support with a mechanical play in a direction.

5. The cell-contacting device of claim 1, wherein the cell-connector support extends in a longitudinal direction and a transverse direction, the cell-connector sheet is installed on or in the cell-contacting support by a linear movement in the longitudinal direction, the transverse direction, and/or a vertical direction of the cell-contacting device.

6. The cell-contacting device of claim 5, wherein the cell-connector sheet is installed on or in the cell-contacting support by a rotational movement about the longitudinal direction, the transverse direction, and/or the vertical direction.

7. The cell-contacting device of claim 1, wherein, when mounting the cell-connector sheet on or in the cell-connector support, the cell-connector sheet is placed with an outer border of the cell-connector sheet at the cell-connector support, the cell-connector sheet is pivoted onto the cell-connector support towards and into the cell-connector support, and the cell-connector sheet is displaced in a plane of the cell-connector support.

8. The cell-contacting device of claim 1, wherein the cell-connector support is a cast part and the cell-connector sheet is a stamped part.

9. The cell-contacting device of claim 1, wherein the cell-connector support has a support frame on or in which the cell-connector sheet is mounted by the snap-fit arrangement, the support frame is provided on a base bar of the cell-connector support, the base bar is disposed between a pair of cell poles of the storage-cell modules.

10. The cell-contacting device of claim 9, wherein the support frame is formed at least partially in a circumferential manner with the base bar as a side of the support frame.

11. The cell-contacting device of claim 9, wherein the spring-loadable latching mechanism has a latching spring that is spring loadable parallel to a transverse direction or a longitudinal direction, the latching spring is formed on the base bar or the support frame.

12. The cell-contacting device of claim 11, wherein the latching spring is a leaf spring.

13. The cell-contacting device of claim 11, wherein a longitudinal end section of a spring arm of the latching spring is attached to the cell-connector support, a rigid connecting latching device is disposed on the longitudinal end section of the spring arm, and/or a spring-loadable spring region of the spring arm is formed as an arc section of the latching spring.

14. The cell-contacting device of claim 13, wherein the spring-loadable latching mechanism has a plurality of latching springs mechanically interconnected at their longitudinal end sections.

15. The cell-contacting device of claim 13, wherein the spring-loadable latching mechanism has a plurality of latching springs, the spring arms of the latching springs are connected by a connecting bar having the rigid connecting latching device.

16. The cell-contacting device of claim 9, wherein the rigid latching device is a projection extending in a transverse direction or a longitudinal direction, the projection is formed on the support frame or the base bar.

17. The cell-contacting device of claim 16, wherein the projection is formed as a bracket, a pair of longitudinal end sections of the bracket are linked to the cell-connector support.

18. The cell-contacting device of claim 9, wherein the cell-connector sheet has a plurality of contacting mechanisms and a plurality of bridging regions, each contacting mechanism has a measuring recess and/or a welding region.

19. The cell-contacting device of claim 18, wherein the cell-connector sheet has a current-tap mechanism on at least one of the contacting mechanisms.

20. The cell-contacting device of claim 18, wherein the support frame has a plurality of mutually alternating windows and bars, at least one of the windows receiving one of the contacting mechanisms.

21. The cell-contacting device of claim 20, wherein at least one of the bridging regions is received on one of the bars.

22. The cell-contacting device of claim 1, wherein a mechanical play between the rigid latching device and the cell-connector sheet in a vertical direction is greater than or equal to a mechanical play between the spring-loadable latching mechanism and the cell-connector sheet in the vertical direction.

23. A battery module, comprising:
a plurality of storage-cell modules electrically connected by a cell-contacting device, the cell-contacting device including a cell-connector support fitted onto the storage-cell modules, the cell-connector support having a snap-fit arrangement, and a cell-connector sheet mounted on or in the cell-connector support by the snap-fit arrangement in a form-fitting manner, the snap-fit arrangement has a spring-loadable latching mechanism and a rigid latching device, the cell-connector sheet is installed and secured between the spring-loadable latching mechanism and the rigid latching device.

* * * * *